(12) United States Patent  (10) Patent No.: US 7,950,664 B2
Chan  (45) Date of Patent: May 31, 2011

(54) SYSTEM AND DEVICE FOR DETERMINING PERSONALITY TYPE

(76) Inventor: John Lap Man Chan, Kowloon (HK)

( * ) Notice: Subject to any disclaimer, the term of this patent is extended or adjusted under 35 U.S.C. 154(b) by 46 days.

(21) Appl. No.: 12/184,256

(22) Filed: Aug. 1, 2008

(65) Prior Publication Data

US 2009/0295088 A1      Dec. 3, 2009

Related U.S. Application Data

(60) Provisional application No. 60/953,208, filed on Aug. 1, 2007.

(51) Int. Cl.
*A63F 1/00* (2006.01)

(52) U.S. Cl. ......... 273/292; 273/161; 273/308; 434/236

(58) Field of Classification Search .................. 273/292, 273/299, 300, 302, 308, 161, 429–431; 434/236
See application file for complete search history.

(56) References Cited

U.S. PATENT DOCUMENTS

| | | | | |
|---|---|---|---|---|
| 142,075 A * | 8/1873 | Billings | ................. | 273/304 |
| 958,258 A * | 5/1910 | Leach | ................. | 273/300 |
| 1,139,356 A * | 5/1915 | Fields | ................. | 273/236 |
| 4,779,870 A * | 10/1988 | Nichols | ................. | 273/161 |
| 5,205,563 A * | 4/1993 | Dearing | ................. | 273/296 |
| 5,435,568 A * | 7/1995 | Black | ................. | 273/303 |
| 6,254,099 B1 * | 7/2001 | Pederson | ................. | 273/292 |
| 6,279,909 B1 * | 8/2001 | Alexander et al. | ................. | 273/249 |
| 6,318,723 B1 * | 11/2001 | Kurita | ................. | 273/308 |
| 6,474,650 B1 * | 11/2002 | Looney | ................. | 273/308 |
| 7,144,013 B2 * | 12/2006 | Tanaka | ................. | 273/308 |
| 7,258,343 B2 * | 8/2007 | Hayakawa et al. | ................. | 273/308 |
| 7,293,773 B2 * | 11/2007 | Bradley | ................. | 273/299 |
| 7,469,901 B1 * | 12/2008 | Hilliard | ................. | 273/308 |
| 2002/0043764 A1* | 4/2002 | Imhof | ................. | 273/292 |
| 2004/0036220 A1* | 2/2004 | Tanaka | ................. | 273/292 |

* cited by examiner

*Primary Examiner* — William M Pierce
(74) *Attorney, Agent, or Firm* — George G. Wang; Bei & Ocean

(57) ABSTRACT

A device and method for determining the personality type of a person or a group of persons in the tradition of the Enneagram. The device includes a number of cards and each of the cards has at least a color band, an image and a group of words, which collectively identifies an ego type.

18 Claims, 5 Drawing Sheets

SYSTEM AND DEVICE FOR DETERMINING PERSONALITY TYPE

CROSS REFERENCE TO RELATED APPLICATIONS

This application claims priority to U.S. Provisional Patent Application No. 60/953,208, filed Aug. 1, 2007, the contents of which are hereby incorporated by reference.

FIELD OF THE INVENTION

This invention relates generally to systems and methods for testing and determining personality/psychological types of individuals, groups or organizations of individuals that collectively exhibit a set of consistent behaviors and traits. Specifically, the present invention is a set of methodology and devices—employable both in physical and virtual formats—for self-typing or assisted-typing by developing a recognizable pattern of inherent traits in reaction to sensory cues, group dynamics and subject-to-subject discussion. This invention can be administered in self-typing and/or counselor-client settings. The output of likely personality type(s) tested and determined from the present invention is in the tradition of an existing body of knowledge known as the Enneagram.

BACKGROUND OF THE INVENTION

There are many different scholastic streams of psychology for understanding the human mind and determining an individual's personality type. From the ancient Greek designations of the Four Humours denoting the innate temperaments to the modern MBTI (Myers Briggs Typology Index) which has been widely employed as typology tool; there exists in this field a myriad of bodies of knowledge. The particular personality typology on which the present invention bases itself is known as the Enneagram.

The theory of Enneagram is founded upon nine (9) personality types or 'worldviews' with which the ego is conditioned to operate. Each of these nine types has its own way of relating to others, its own set of perceptions and preoccupations, its own values and approaches to life. The personality or the 'ego' is regarded as a product of fixation from psychological defenses and so obscures the true human essence. It is the primary aim of the Enneagram (or any teachings of psychology for that matter) to loosen the grip of the 'ego' in order to liberate the 'essential self'—one that is free from preconceived notions or emotional attachments and so is able to have direct contact with reality. It is believed that in order to uncover our essential selves we must have awareness for who our 'ego' is—and consequently who we are not. By recognizing our own personality type and its mental structures, it is believed that an individual can begin to deconstruct the 'ego' to let reveal his/her true essential self.

As a typology, the Enneagram helps people recognize and understand overall patterns in human behavior. External behaviors, underlying attitudes, one's characteristic sense of self, conscious and subconscious motivations, emotional reactions, defense mechanisms—and much more—are all parts of the complex pattern that forms each personality type. While the Enneagram suggests that there are nine basic personality types of human nature, there are many subtypes and variations within the nine basic categories—analogous to the countless hues within the spectrum of each color. The colors pink and burgundy may be different shades of red; but they are both of the same family in the primary color of 'red'. These types in turn have their own sets of axes on which they move dynamically and systematically—fully reflecting the richness of human personality as we fluctuate on a continuum between security and stress. All these nine personality types are traditionally designated by a corresponding number, namely Type ONE, Type TWO and so on to Type NINE. Modern interpretations by Enneagram teachers and psychologists alike have suggested single descriptive words to personify the types; such as 'Reformer' for Type ONE, 'Helper' for Type TWO and 'Peacemaker' for Type NINE. Either preference is widely accepted in the field of study.

Even with all of these subtle distinctions that make the Enneagram one of the most robust and dynamic personality typology systems today; it is recognized that the complexity and fluidity of the human psyche requires the continual invention and improvement of tools that enable us to gain access into the body of knowledge, uncover deeper insights within its vast framework of wisdom.

While the Enneagram is primarily a profound psychological and spiritual tool, it is also highly practical for business applications because its insights are so on target. Many businesses and organizations, including AT&T, Boeing Corporation, e-Bay, General Motors, Kodak, Toyota, Proctor & Gamble and SONY, are using Enneagram in management to increase employees' productivity and, ultimately, their profitability. Corporations have been using the Enneagram for hiring the best possible person for a particular job, for teaching executives to manage their employees more effectively, for customer service, for building a corporate "personality type", so to speak—or for team-building. So there exists great practical value for a personality typing tool that is easy to deploy, yet faithful to the finest original teachings of this rich and robust knowledge.

The Enneagram as a symbol was first brought to the attention of the modern world by the Greek-Armenian spiritual teacher George Ivanovitch Gurdjieff around the turn of the twentieth century. The typology now associated with the symbol was developed by Oscar Ichazo, the founder of Arica Institute in Arica, Chile in the 1950s. In developing the basic principles of the Enneagram theory, Ichazo drew on classic Greek philosophy and ancient spiritual ideas from mystical Judaism and early Christianity. Later, gestalt psychiatrist Claudio Naranjo brought the Enneagram to the United States where the system of knowledge quickly spread. In 1973, Don Richard Riso began developing the Enneagram in the light of modern psychology. He was joined by Russ Hudson in 1988, and together they have been adding original insights and discoveries to the initial body of knowledge.

It is on this lineage of the Enneagram system that the present invention bases itself. The textual portion appearing on the current version of the invention and the terminology used in this submission originate from copyrighted materials of Don Richard Riso and Russ Hudson and are reproduced with permission. The architectural concept of the device and the methodology for which the device is deployed are original to the inventor.

SUMMARY OF THE INVENTION

The present invention is a set of methods and devices for determining a subject's personality type. The design and appearance of the devices are in the form of flashcards—presented physically and/or electronically—containing both textual and visual information particular to one of a set of personality types to which this test methodology eventually determines and outputs. Preferably, the set consists of nine personality types as used in the Enneagram. The stimuli as presented on each flashcards that make up the device are highly contextual to the individual personality types and they serve as the primary source of information and sensory input on which a test subject's identification is made.

In addition to the presentation of these stimuli the flashcards are—for the central purpose of providing a patterning mechanism for type analysis and determination—organized further by color-coding and iconic symbols. The patterning mechanism is the main design feature that makes possible for test subjects to conduct interactions amongst other subjects and/or test administrator in the selecting their hand of flashcards. The typing methodology involves the test subjects selecting a certain number of flashcards with which the test subjects identify. Through rounds of interaction involving selection, de-selection and swapping, the test subjects shall have in their possession a hand of flashcards that display a set of discernible pattern(s) by their color codes and/or iconic symbols. Each of these flashcards is representative of a certain personality type in the tradition of the Enneagram. As a result, the test subjects and/or the test administrator are able to determine the likely type based on the predominant pattern and/or sub-patterns that emerge.

The formats for presenting the devise to test subjects include but are not limited to hand-held flashcards, virtual flashcards administered by a computer program, and virtual flashcards administered via mobile devices. Whereas the personality typology test can be administered with devices on different formats, the methodology for determining the type remains the same.

The present invention claims only the methodology and those devices designed for such methodology in determining the subjects' personality types. The device comprises a set of cards, having front surface and back surface. On the front surface, there are, in addition to images and words, one or more color bands and/or one or more icon. Preferably, there are two color bands, on the top and bottom portions of the card, respectively. The preferred icons are triadic icons. The body of knowledge on personality types to which the present invention refers is titled Enneagram, forms no part of the present invention and thus does not limit the scope of the invention. Outputs of test
results are any of the nine personality types as found in the theory of Enneagram, although using less or more than nine personality types may also produce satisfactory results.

Behavioral traits and characteristics are integral ingredients to any personality typing systems. One aspect of the Enneagram teachings is a set of knowledge for recognizing the different ego types using specific, observable traits in defined combinations. A stand-alone trait may generally apply to several or all different personality types; however, when observed in conjunction with a set of other traits this combination will apply specifically to a particular ego type. For example, while many personality types may exhibit the trait of being 'Driven'; the combination of traits: 'Adaptable, Excellent, Driven, Image-conscious' applies particularly and specifically to the ego Type Three (The Achiever).

The textual descriptors of the behavioral traits are complemented by a portion of the device that contains multiple imageries designed to stimulate mental and emotional associations experienced for when those traits are engaged. For example, the image of an athlete crossing the finish line is associated with the key descriptor 'Competitive'—serving to deepen the mental and emotional import, and enhancing the subjects' resonance to the trait by non-verbal display through the subtler nuances of the image, such as the exhilarating expression on the athlete's face, the intensity of the competition from other challengers, etc. The arrangements of these imageries are designed to appeal to and be taken in by both the conscious and the subconscious, the right and the left brain; so, in this way their association to the key descriptors is not always literal. Symbolic, iconic, archetypal imageries important to the different ego types are also used.

The other textual portion of the device is aimed to create a chain reaction of self-query—the proverbial drop in the pond to start the ripple effect. At the bottom where a test subject would naturally and normally complete the reading of a flashcard, a 'Self-directed Question' is posed to the subject to test for internal agreement. This section is designed to follow (in the natural scan direction of the eye) the subjects' reading of the key descriptors and the imageries of association, and act as a mental verifier for or against the information thus far conveyed in a flashcard. There is a distinct question on each flashcard as are different the key descriptors and imageries on each of them. Each question is designed and phrased in a context that would especially resonate with the internal motivations of its particular ego type. For example, the question: 'Am I tired of chasing a dream that does not feel my own?' is directed to Type Three (The Achiever) whose ego fixation is motivated by and centered around the pursuit of success at all costs. The subject's mind may on its own set off to pose a series of self-queries along the same line; as a matter of example, 'So, whose dream is it really? . . . what are the things I have sacrificed along the way? . . . what are my own dreams? . . . etc.' Internal agreement and resonance to the self-directed questions, if any, is likely to be expressed by a mixture of mental accord and deep emotional affinity.

As subjects collect the flashcards with which they find identification, those cards in the hand are likely to display an emerging pattern. There are six areas where patterns could emerge. On the front, patterns form and are recognizable by the matching of color-coded bands on top and at bottom, and the matching of Triadic icons. On the back (as when viewed by others in group play mode or when the cards are laid face-down), patterns form and are recognizable by the matching of color-coded card backs, of color-coded card rings, and of the Triad icons. The flashcards are so designed as to enable visibility to both the card-holding subject and other subjects present to recognize these emerging patterns.

The unique design of the patterning mechanism arranged in counterparts discernible both face-up and face-down is central to the design of the methodology and the general philosophy of seeking self-discovery. A main tenet of the methodology is interaction. It is with the belief that we can best embark on self-discovery with the support and help of others; and so by engaging in mutual interactions this whole exercise of determining our types takes on a spirit and an effectiveness that benefits from group energy and collective wisdom.

The various features of novelty which characterize the invention are pointed out with particularity in the claims annexed to and forming a part of this disclosure. For a better understanding of the invention, its operating advantages, and specific objects attained by its use, reference should be made to the drawings and the following description in which there are illustrated and described preferred embodiments of the invention.

BRIEF DESCRIPTION OF DRAWINGS

The invention and its application are best understood with reference to the drawings which show particular embodiments of the present invention, in which.

DETAILED DESCRIPTION OF THE INVENTION WITH PARTICULAR EMBODIMENTS

Due to the vast number of permutations present in the outcome capable of being produced by the present invention, throughout this description, the preferred embodiment and examples shown should be considered as exemplars, rather than limitations on the methodology and the device of the present invention.

In a particular embodiment of the present invention, the device is made up in total thirty-six (36) flashcards each with distinct information content, grouped into four (4) cards for each of the nine (9) personality types. The presentation format of this device includes but not limited to hand-held cards, virtual cards presented electronically by a computer program, and virtual cards presented via mobile devices.

Figure 1:
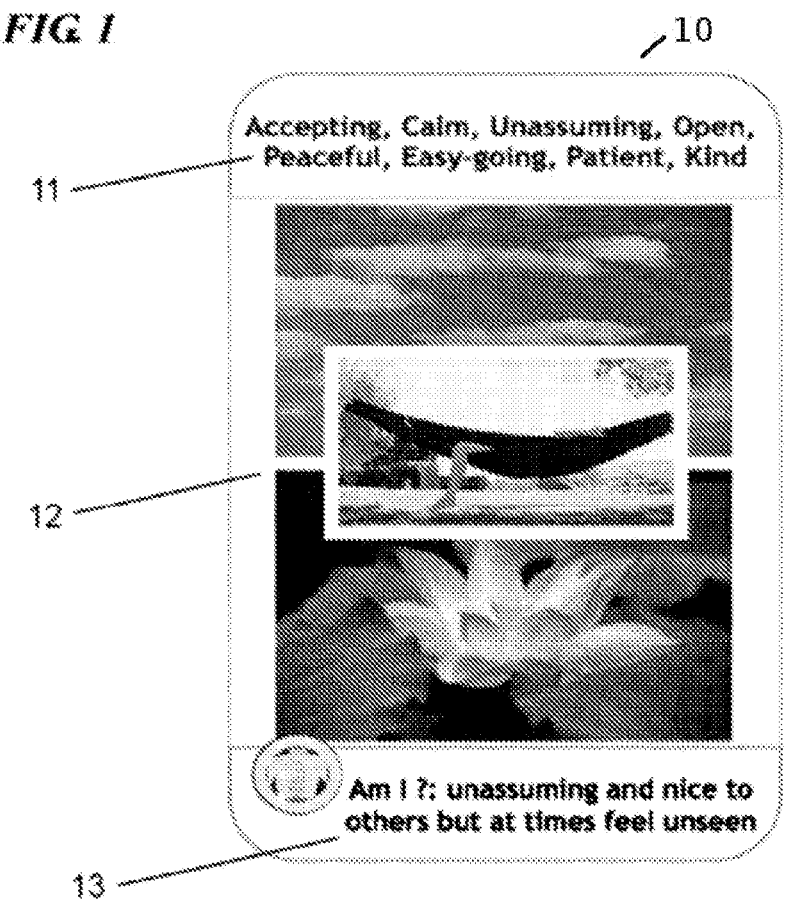
FIG. 1 is a frontal representation of one of the 36 flashcards that make up the device.

The nine personality types for which the present invention tests and determines are in the tradition of the Enneagram:
1. TYPE ONE—The Reformer
2. TYPE TWO—The Helper
3. TYPE THREE—The Achiever
4. TYPE FOUR—The Individualist
5. TYPE FIVE—The Investigator
6. TYPE SIX—The Loyalist
7. TYPE SEVEN—The Enthusiast
8. TYPE EIGHT—The Challenger
9. TYPE NINE—The Peacemaker Referring now to FIG. 1, a frontal representation of one of the 36 flashcards that make up the device, a subject is presented with textual and visual information by three sources of stimuli: Key Descriptors 11, Imageries of Association 12, and Self-directed Questions 13. When presented with a flashcard 10 the objective of the test is for the subject to study the information thereon and reach a decision whether an identification to the same is made. This identification is more precisely termed 'resonance'—be it a positive feeling towards the information or a negative feeling of repulsion. Such identification is deemed to be significant for the purpose of type determination. The opposite to resonance—for which no identification is felt to be present—is 'indifference'.

'Key Descriptors' are a compilation of single words descriptive of the behavioral traits characteristic of the individual personality types. Although singly these terms may apply in generality to any one or more personality types; collectively in specific combinations they are particular to and apply directly to individual types. A subject who is looking at the flashcards that is representative of his/her type is likely to develop resonance.

The terms used for the 'Key Descriptors' present in this invention are copyrighted to Don Richard Riso and Russ Hudson and are reproduced with permission, so they—as an element to the design—do not fall into the claims of the present invention and thus will not be reproduced in this description of embodiment. The functionality of the 'Key Descriptor' as a source of textual information used for type identification is, however, one of the integral parts of the device design architecture and the same is amenable to further developments and other sources of terms—copyrighted or original.

'Imageries of Association' are a compilation of visual images, graphical and/or photographical, that are designed to stimulate mental and emotional associations experienced for when those traits stated in 'Key Descriptors' on the same flashcards are engaged. For example, the image of an athlete crossing the finish line is associated with the key descriptor 'Competitive'—serving to deepen the mental and emotional import, and enhancing the subjects' resonance to the trait by non-verbal display through the subtler nuances of the image, such as the exhilarating expression on the athlete's face, the intensity of the competition from other challengers, etc. The arrangements of these imageries are designed to appeal to and be taken in by both the conscious and the subconscious, the right and the left brain; so, in this way their association to the key descriptors is not always literal. Symbolic, iconic, archetypal imageries important to the different ego types are also used.

The images used for the 'Imageries of Association' present in this invention are copyrighted to various sources and are reproduced with permission, so they—as an element to the design—do not fall into the claims of the present invention and thus will not be reproduced in this description of embodiment. The functionality of the 'Imageries of Association' as a source of visual information used for type identification is, however, one of the integral parts of the device design architecture and the same is amenable to further developments and other sources of images—copyrighted or original.

'Self-directed Questions' are aimed to create a chain reaction of self-query by free association in the subject's mind for the purpose of testing for internal agreement. A self-directed question acts as a mental verifier for or against the information thus far conveyed on the flashcard. There is a distinct question on each flashcard as are different the key descriptors and imageries on each of them. Each question is designed and phrased in a context that would especially resonate with the internal motivations of its particular ego type, causing more self-query in the same direction. Internal agreement and resonance to the self-directed questions, if any, is likely to be expressed in a mixture of mental accord and deep emotional affinity.

The questions posed in the section of 'Self-directed Questions' present in this invention are as follows. The functionality of the 'Self-directed Questions' as a source of textual information used for type identification is, however, one of the integral parts of the device design architecture and the same is amenable to further developments and other sources of text—copyrighted or original.

Figure 2:
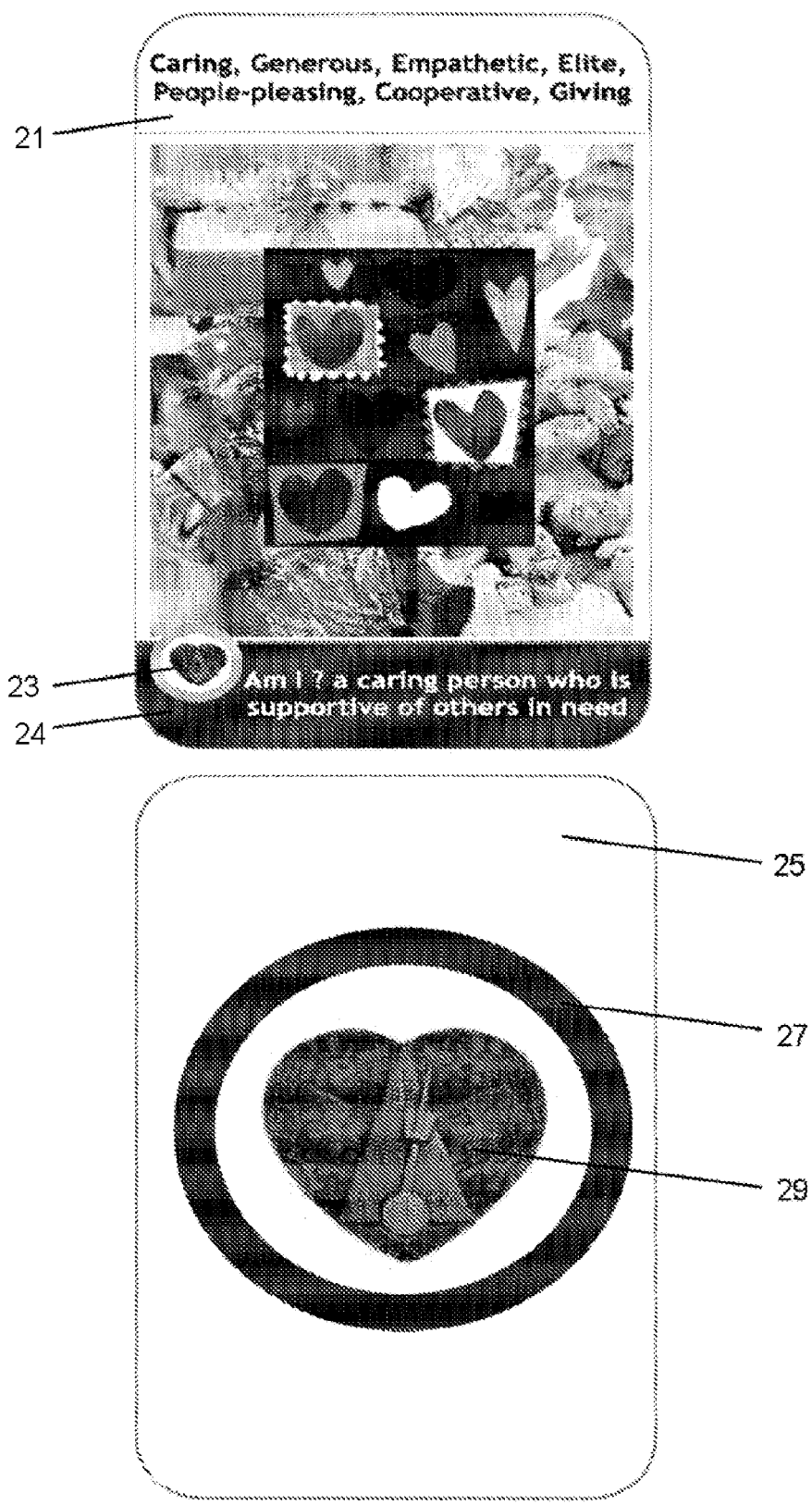
FIG. 2 is a representation of the patterning mechanism on the front and back of the device.

The central purpose of the present invention is to effectively sort through the immensely rich and subtle language of the Enneagram and to provide an easy-to-use and accurate tool for type analysis and determination. The typing methodology with which the device uses to determine types is the patterning mechanism. It is the integral design element of the device and functions as an overall architecture for forming and recognizing emerging patterns on those flashcards selected by test subjects. The patterning mechanism organizes the device by color codes and iconic symbols in six areas: Front Top Color Band 21, Front Bottom Color Band 24, Front Triadic Icon 23, Back Card Color 25—counterpart to 'Front Top Color Band', Back Card Ring 27—counterpart to 'Front Bottom Color Band', and Back Triadic Icon 29—counterpart to 'Front Triadic Icon'(FIG. 2).

The 'Front Top Color Band' is located on the front side at the top of the flashcard, in the same space as the key descriptors. It is color-coded into three (3) colors: 1) white, 2) grey, and 3) black. Together these colors are representative of a first triad group (not to be confused with Triadic Group) known as the 'Harmonics Group', itself comprising of sub-groups respectively: a) Positive Outlook Group, b) Competency Group, and c) Intensity Group. Of the nine personality types, Type Two (The Helper), Type Seven (The Enthusiast), and Type Nine (The Peacemaker) belong to the Positive Outlook Group. Types One (The Reformer), Three (The Achiever), and Five (The Investigator) belong to the Competency Group. Lastly Types Four (The Individualist), Six (The Loyalist), and Eight (The Challenger) form the Intensity Group.

Its counterpart, 'Back Card Color', has the same designations and serves the same function of grouping ego types in accordance to the Harmonics Group. The three colors make up the background of the flashcard back.

The 'Bottom Front Color Band' is located on the front side at the bottom of the flashcard, in the same space as the self-directed question. It is color-coded into three (3) colors: 1) white, 2) blue, and 3) red. Together these colors are representative of a second triad group known as the Hornevian Group (after the late psychologist Karen Horney), itself comprising of sub-groups respectively: a) Withdrawn Group, b) Dutiful Group, and c) Assertive Group. Types Four, Five, and Nine belong to the Withdrawn Group. Types One, Two, and Six belong to the Dutiful Group. Types Three, Seven, and Eight belong to the Assertive Group.

Its counterpart, 'Back Card Ring', has the same designations and serves the same function of grouping ego types in accordance to the Hornevian Group. The three colors are displayed on a ring shape encircling the 'Back Triadic Icon' on the flashcard back.

The 'Front Triadic Icon' is located on the front side at the lower left corner of the flashcard. It shows one of three (3) iconic symbols: 1) a heart, 2) a head, and 3) a torso. Together these symbols are representative of a third triad group known as the Triadic Group, itself comprising of sub-groups respectively: a) Feeling Center, b) Thinking Center, and c) Instinctive Center. Types Two, Three, and Four belong to the Feeling Center. Types Five, Six, and Seven belong to the Thinking Center. Types Eight, Nine, and One belong to the Instinctive Center.

Its counterpart, 'Back Triadic Icon', has the same designations and serves the same function of grouping ego types in accordance to the Triadic Group. The three icons are centrally displayed on the flashcard back.

Figure 3:
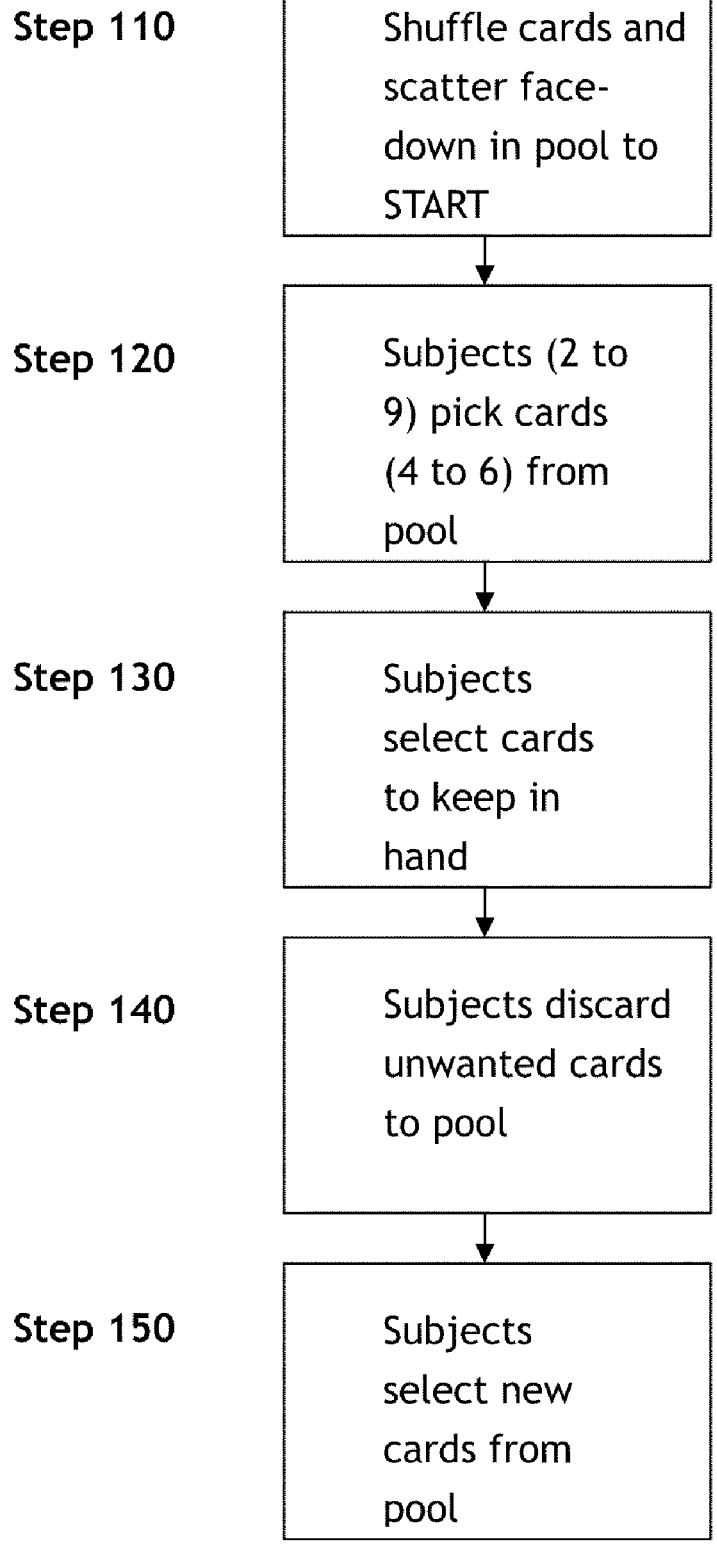
FIG. 3 is a flow chart for type testing procedure involving test subject(s) selecting cards.

Refer now to FIG. 3, a flow chart for type testing procedure involving test subject(s) selecting cards only from the deck, the test subjects in Step 110 start by shuffling the cards evenly to ensure random selection of flashcards for starting off the test. The purpose is to minimize pre-conceived notions in selecting their hand by exposing to test subjects different type description possibilities by random. The number of flashcards in a deck is 36 and is divisible by the numbers 2, 3, 4, 6—enabling test settings involving as many participants. 4 subjects at a single test setting is recommended. At Step 120 subjects are dealt cards from the deck in any manner preferred until each subject has in his/her hand a set number of cards. Up to 6 cards per subject is recommended. The remaining deck of cards is then scattered into a pool with their face down. At Step 130 the subjects study the cards and select which ones they would like to keep based on the above-mentioned criteria of resonance. At Step 140 and 150 the subjects discard back into the pool any unwanted cards, and then select the corresponding number of new cards. Having some prior to exposure to the patterning mechanism, the subjects can select their new cards more consciously. This process is repeated for as long as the participants agree; or alternatively is continued
with the next selection process outlined below.

Figure 4:
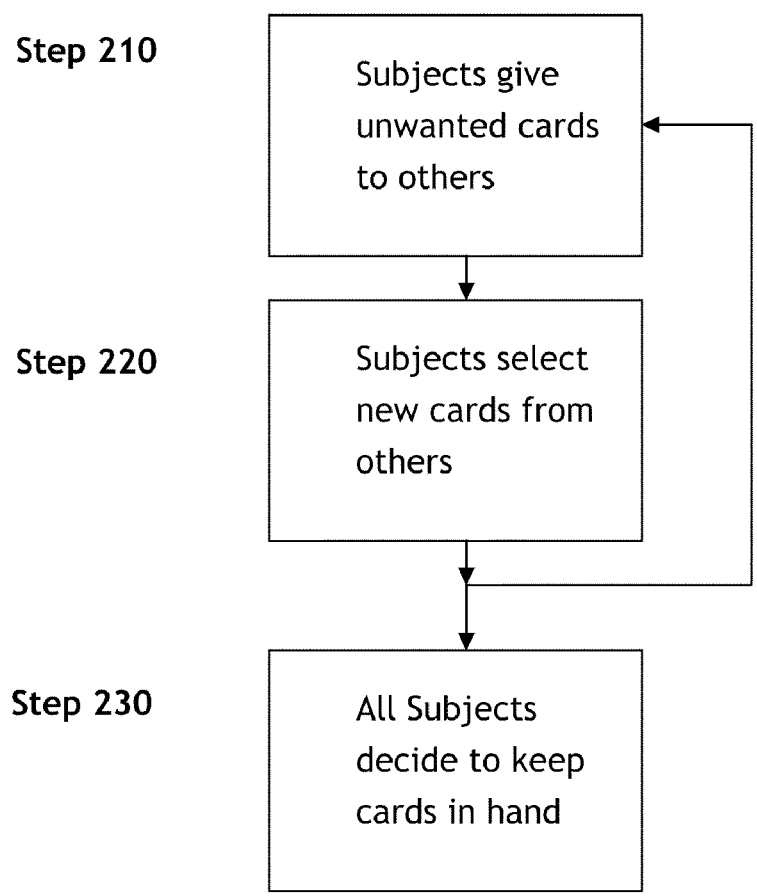
FIG. 4 is a flow chart for type testing procedure involving test subject(s) selecting cards amongst each other.

Referring now to FIG. 4, a flow chart for type testing procedure involving test subject(s) selecting cards amongst each other, the test subjects in Step 210 decide which cards in their hands are unwanted and must decide which of the other test subjects in the group he/she is to give the unwanted cards. By noticing the back of the flashcards held by the other subjects and their emerging pattern, a test subject can consciously elect to give the unwanted cards in accordance to the patterns observed. For example, if I had an unwanted card bearing a head icon and a front bottom color band that is red; I can look for a fellow subject who appears to be collecting a head icon card, a red bottom color band card, or both. This conscious swapping builds a mutually supportive spirit in helping each other achieve their card collection more quickly and more easily. Moreover, the conscious exchange of cards encourages interaction of the group which builds trust and rapport in preparation for the next mode of group interaction in the final process. This process is repeated for as long as the participants agree; or alternatively is continued with the final selection process outlined below.

Figure 5:
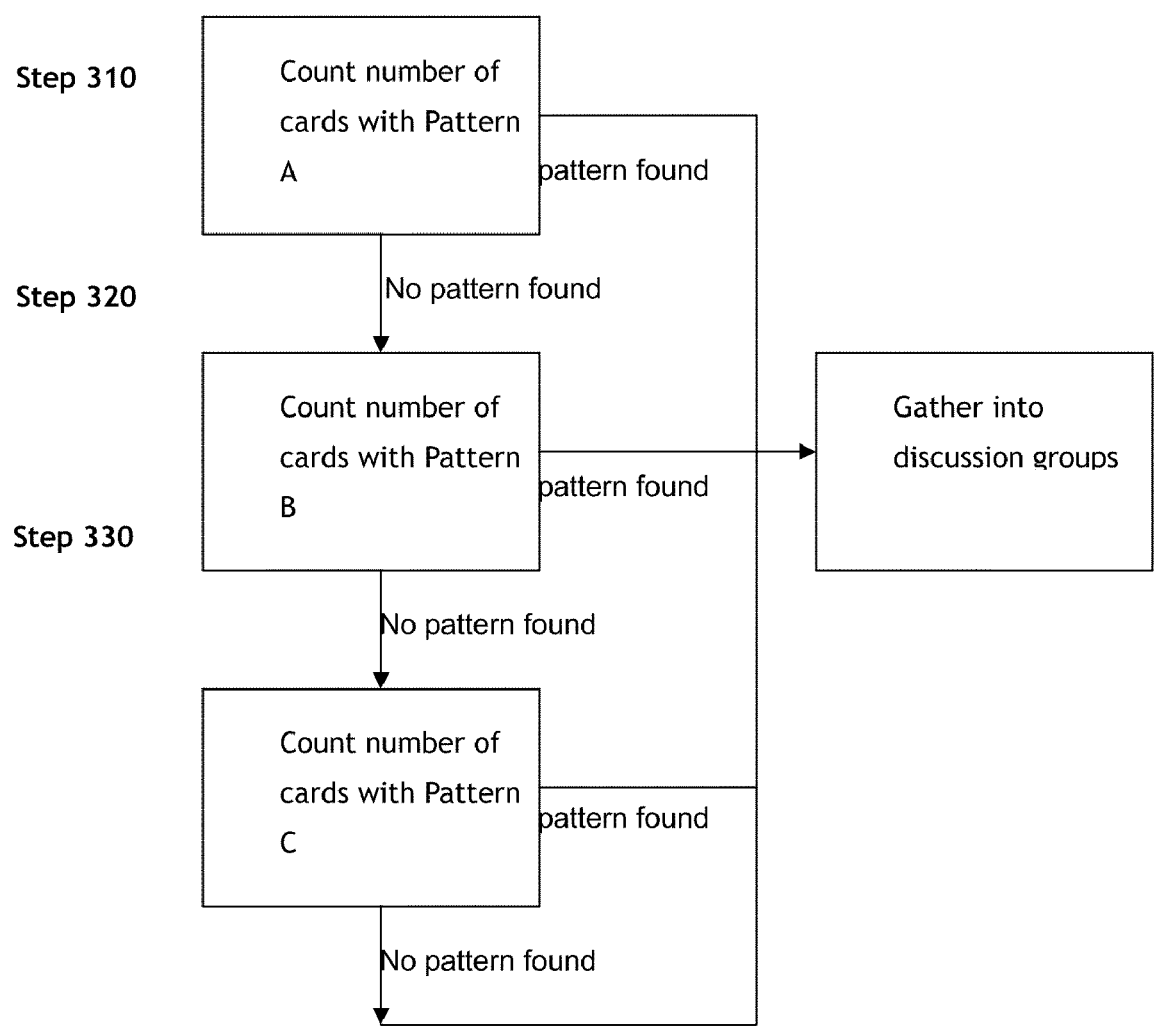
FIG. 5 is a flow chart for type testing procedure involving test subject(s) forming discussion groups based on the patterning mechanism.

Referring now to FIG. 5, a flow chart for type testing procedure involving test subject(s) forming discussion groups based on the patterning mechanism, the test subject(s)—following the selection of cards and the counting of those that fall into a pattern(s)—enters into and selects the discussion group with which he/she finds the most resonance. Based on the counting results the test subjects may find themselves in more than one group. For those who find themselves in more than one group may take turns participating in discussion with those different groups. While it is likely that the subjects will find the most resonance with the group for which he/she has collected the most cards; it is also possible that he/she feels the strongest resonance in another group for which he/she has less cards. This final selection process moves beyond the device and is reliant on the subtle yet powerful personality dynamics between real people to verify the previous selection processes.

There are in total nine (9) discussion groups that may form in accordance to the patterning mechanism:

1. The Harmonics Group A—Positive Outlook
(Types belonging to this group includes: TWO, SEVEN and NINE)
2. The Harmonics Group B—Competency
(Types belonging to this group includes: ONE, THREE and FIVE)
3. The Harmonics Group C—Intensity
(Types belonging to this group includes: FOUR, SIX and EIGHT)
4. The Hornevian Group A—Withdrawn
(Types belonging to this group includes: FOUR, FIVE and NINE)
5. The Hornevian Group B—Dutiful
(Types belonging to this group includes: ONE, TWO and SIX)
6. The Hornevian Group C—Assertive
(Types belonging to this group includes: THREE, SEVEN and EIGHT)
7. The Triadic Group A—Heart
(Types belonging to this group includes: TWO, THREE and FOUR)

8. The Triadic Group B—Head
(Types belonging to this group includes: FIVE, SIX and SEVEN)
9. The Triadic Group C—Instinctive
(Types belonging to this group includes: EIGHT, NINE and ONE)

To complete the test, the subjects make an informed decision on which of the nine personality types most reflect them—arrived at through multiple rounds of conscious interaction with both the cards and their interactions with other test subjects. The flashcards of the nine personality types bear the following patterning characteristics:

1. TYPE ONE—The Reformer
Front Top Color Band/Back Card Color—GREY
Front Bottom Color Band/Back Ring Color—BLUE
Front Triadic Icon/Back Triadic Icon—TORSO (INSTINCTIVE)
2. TYPE TWO—The Helper
Front Top Color Band/Back Card Color—WHITE
Front Bottom Color Band/Back Ring Color—BLUE
Front Triadic Icon/Back Triadic Icon—HEART
3. TYPE THREE—The Achiever
Front Top Color Band/Back Card Color—GREY
Front Bottom Color Band/Back Ring Color—RED
Front Triadic Icon/Back Triadic Icon—HEART
4. TYPE FOUR—The Individualist
Front Top Color Band/Back Card Color—BLACK
Front Bottom Color Band/Back Ring Color—WHITE
Front Triadic Icon/Back Triadic Icon—HEART
5. TYPE FIVE—The Investigator
Front Top Color Band/Back Card Color—GREY
Front Bottom Color Band/Back Ring Color—WHITE
Front Triadic Icon/Back Triadic Icon—HEAD
6. TYPE SIX—The Loyalist
Front Top Color Band/Back Card Color—BLACK
Front Bottom Color Band/Back Ring Color—BLUE
Front Triadic Icon/Back Triadic Icon—HEAD
7. TYPE SEVEN—The Enthusiast
Front Top Color Band/Back Card Color—WHITE
Front Bottom Color Band/Back Ring Color—RED
Front Triadic Icon/Back Triadic Icon—HEAD
8. TYPE EIGHT—The Challenger
Front Top Color Band/Back Card Color—BLACK
Front Bottom Color Band/Back Ring Color—RED
Front Triadic Icon/Back Triadic Icon—HEAD
9. TYPE NINE—The Peacemaker
Front Top Color Band/Back Card Color—WHITE
Front Bottom Color Band/Back Ring Color—WHITE
Front Triadic Icon/Back Triadic Icon—TORSO (INSTINCTIVE.

While there have been described and pointed out fundamental novel features of the invention as applied to a preferred embodiment thereof, it will be understood that various omissions and substitutions and changes, in the form and details of the embodiments illustrated, may be made by those skilled in the art without departing from the spirit of the invention. The invention is not limited by the embodiments described above which are presented as examples only but can be modified in various ways within the scope of protection defined by the appended patent claims.

What is claimed is:

1. A device for personality typing, comprising a plurality of cards, each of said cards having a front surface and a back surface; said front surface comprises a first area, a second area, a third area and a fourth area, said first area comprising a background color and a textual descriptor of a behavioral trait printed or displayed on said background color, said second area comprising an image designed to stimulate a mental or emotional association experienced when said trait is engaged, said third area comprising a background color, and said fourth area comprising an iconic symbol; said back surface having a background color which is substantially the same as said background color of said first area of said front surface, and a colored area with a color which is substantially the same as said background color of said third area of said front surface; wherein said front surface lacks an area designed for adding new content while in operation.

2. The device of claim 1, wherein said first area defines a top band on said front surface and said third area defines a bottom band on said front surface.

3. The device of claim 2, wherein said behavior trait is described according to the Enneagram of Personality and belongs to one of nine personality types according to the Enneagram system.

4. The device of claim 1, wherein said third area comprising a question directed to a user.

5. The device of claim 1, wherein said background color of said first area of said front surface, said background color of said third area of said front surface and said iconic symbol together define a patterning mechanism which organizes said plurality of cards.

6. The device of claim 5, wherein said first background color of said first area of said front surface is selected from the group consisting of white, grey and black, said background color of said third area of said front surface is selected from the group consisting of white, blue and red, and said iconic symbol is a triadic icon selected from the group consisting of heart, head and torso, and wherein said patterning mechanism organizes said plurality of cards into nine sets corresponding to nine personality Enneagram types.

7. The device of claim 6, wherein said back surface further comprises an iconic symbol which is substantially the same as said iconic symbol in said fourth area of said front surface but is the same or a different size thereof.

8. The device of claim 7, wherein said colored area of said back surface is a color-coded card ring.

9. The device of claim 1, wherein said plurality of cards are hand-held flashcards.

10. The device of claim 1, wherein said plurality of cards are virtual flashcards administered by a computer program.

11. The device of claim 1, wherein said plurality of cards are virtual flashcards administered by a mobile device.

12. The device of claim 1, wherein said plurality of cards are hand-held flashcards.

13. The device of claim 1, wherein said plurality of cards are virtual flashcards administered by a computer program.

14. The device of claim 1, wherein said plurality of cards are virtual flashcards administered by a mobile device.

15. The device of claim 6, wherein said plurality of cards are hand-held flashcards.

16. The device of claim 6, wherein said plurality of cards are virtual flashcards administered by a computer program.

17. The device of claim 6, wherein said plurality of cards are virtual flashcards administered by a mobile device.

18. The device of claim 7, wherein said plurality of cards are hand-held flashcards, virtual flashcards administered by a computer program or virtual flashcards administered by a mobile device.

* * * * *